(12) United States Patent
Knapp (10) Patent No.: US 6,367,802 B1
(45) Date of Patent: Apr. 9, 2002

(54) ANNULAR GASKET WITH LOCKING STRUCTURE

(75) Inventor: Mark A. Knapp, Ravenna, OH (US)

(73) Assignee: Malcolm Mann Inc., Chagrin Falls, OH (US)

(*) Notice: Subject to any disclaimer, the term of this patent is extended or adjusted under 35 U.S.C. 154(b) by 0 days.

(21) Appl. No.: 09/726,814

(22) Filed: Nov. 30, 2000

Related U.S. Application Data (60) Provisional application No. 60/168,052, filed on Nov. 30, 1999.

(51) Int. Cl.[7] ............ F16L 21/03; F16L 21/08
(52) U.S. Cl. ......... 277/314; 277/609; 277/616; 277/624; 285/340; 285/903
(58) Field of Search ............... 277/314, 608, 277/609, 616, 619, 624, 625; 285/903, 104, 340, 379

(56) References Cited

U.S. PATENT DOCUMENTS

| | | | |
|---|---|---|---|
| 2,230,725 A | * | 2/1941 | Nathan |
| 3,796,447 A | | 3/1974 | de Putter |
| 3,856,315 A | * | 12/1974 | Stansbury |
| 3,955,834 A | | 5/1976 | Ahlrot |
| 4,097,074 A | * | 6/1978 | Nagao et al. |
| 4,188,040 A | * | 2/1980 | Wolf et al. |
| 4,223,895 A | * | 9/1980 | Roberts, Jr. et al. |
| 4,298,206 A | | 11/1981 | Kojima |
| 4,387,900 A | | 6/1983 | Ditcher et al. |
| 4,394,024 A | * | 7/1983 | Delhaes |
| 4,487,421 A | | 12/1984 | Housas et al. |
| 4,575,128 A | | 3/1986 | Sundquist |
| 4,602,792 A | | 7/1986 | Andrick |
| 4,602,793 A | | 7/1986 | Andrick |
| 4,630,848 A | * | 12/1986 | Twist et al. |
| 4,641,858 A | | 2/1987 | Roux |
| 4,818,209 A | | 4/1989 | Petersson et al. |
| 4,826,028 A | | 5/1989 | Vassallo et al. |
| 4,834,398 A | | 5/1989 | Guzowski et al. |
| 5,058,907 A | | 10/1991 | Percebois et al. |
| 5,064,207 A | | 11/1991 | Bengtsson |
| 5,067,751 A | | 11/1991 | Walworth et al. |
| 5,180,196 A | | 1/1993 | Skinner |
| 5,288,087 A | * | 2/1994 | Bertoldo |
| 5,324,083 A | | 6/1994 | Vogelsang |
| 5,407,236 A | * | 4/1995 | Schwarz et al. |
| 5,415,436 A | | 5/1995 | Claes et al. |
| 5,542,717 A | | 8/1996 | Rea et al. |
| 5,573,279 A | | 11/1996 | Rea et al. |
| 5,603,532 A | * | 2/1997 | Guest |
| 5,813,705 A | * | 9/1998 | Dole |
| 5,988,695 A | | 11/1999 | Corbett, Jr. |
| 6,082,741 A | | 7/2000 | Gregoire et al. |
| 6,126,209 A | | 10/2000 | Goddard |
| 6,170,883 B1 | | 1/2001 | Mattsson et al. |
| 6,193,285 B1 | * | 2/2001 | Proctor |

* cited by examiner

*Primary Examiner*—Anthony Knight
*Assistant Examiner*—John L. Beres
(74) *Attorney, Agent, or Firm*—Watts, Hoffmann, Fisher & Heinke Co.

(57) ABSTRACT

A locking annular gasket, for providing a seal between a tubular member and a smooth annular section, includes an annular gasket portion and a locking member. The annular gasket portion seals a gap between the smooth annular section and the tubular member. The locking member is secured to the gasket portion for holding the gasket portion in place while the tubular member and the smooth annular section are assembled.

22 Claims, 4 Drawing Sheets

ANNULAR GASKET WITH LOCKING STRUCTURE

This appln claims benefit of Prov. No. 60/168,052 filed Nov. 30, 1999.

TECHNICAL FIELD

The present invention relates to elastomeric gaskets and, more specifically, to locking gaskets for providing a seal between a pair of tubular members, particularly corrugated pipe.

BACKGROUND ART

It is well known to form a seal between two pipe sections where the end of one of the pipe sections has annular grooves and one of the pipe sections has an enlarged bell portion. Some prior art elastomeric gasket 5 are placed around the end of the pipe section having annular grooves. The pipe section having annular grooves is inserted into an enlarged bell portion of a second pipe section. The elastomeric gasket contacts each of the pipe sections to form a seal between the pipe sections.

Some prior art gaskets are adapted to fit in the groove of a corrugated pipe or pipe connector. As one end of a pipe is pushed into the enlarged end of another pipe section or pipe connector, the gasket is sometimes pulled from the groove and the pipe is not properly sealed. When the pipe is not properly sealed ground water may leak into the pipe or fluid may leak out of the pipe and contaminate the ground.

U.S. Pat. No. 4,702,502 attempted to solve the problem where the gasket was pulled from the annular grooves of a corrugated pipe when the corrugated pipe was inserted into a bell portion of a second corrugated pipe. The '502 patent concerns a telescopic joint in low pressure corrugated plastic pipes. The joint includes a one piece elastomeric gasket that has a sealing portion adapted to be disposed in a groove in one of the pipes and an anchoring portion adapted to be disposed in an adjacent groove. As the pipes are telescoped together the anchoring portion is trapped in the groove and anchors the sealing portion in place as it is compressed.

U.S. Pat. No. 3,796,447 to de Putter concerns a corrugated pipe connector for connecting ends of two male pipes. A rubber sealing ring is maintained in a corrugation of the pipe connector by a maintaining ring. The maintaining ring avoids removal of the sealing ring from the corrugation of the pipe connector during insertion of the male pipe ends into the corrugated pipe connector.

U.S. Pat. No. 4,834,398 to Guzowski et al. concerns a pipe sealing gasket having a first portion formed out of a hard, relatively high durometer material and a second portion formed of a relatively lower durometer, more flexible material. The harder first portion of the gasket is contacted first as the pipes are assembled, causing the gasket to maintain its position during assembly.

Typically, gaskets between two corrugated pipes do not securely lock the corrugated pipes together once they are assembled. A gasket is needed which includes an integral locking member that holds a gasket portion in place during assembly of two pipes and securely locks the pipes together once they are assembled.

SUMMARY OF THE INVENTION

The present invention is directed to a locking annular gasket for providing a seal between a first tubular member having an annular groove and an adjacent ridge and a smooth annular section of a second member, when the first member and the smooth annular section of the second member are in a relative surrounded a surrounding relationship. The locking annular gasket includes an annular gasket portion and a locking member. The annular gasket portion seals a gap between the first tubular member and the annular section of the second member when the first tubular member and the smooth annular section are in a relative surrounded and surrounding relationship. The locking member is secured to the gasket portion for holding the annular gasket portion in place while the first tubular member and the smooth annular section are being brought into a relative surrounded and surrounding relationship.

In one embodiment, the locking member includes a locking arm that extends into the annular groove of the first tubular member when the first tubular member and the smooth annular section are in a relative surrounded and surrounding relationship. The locking arm locks the first tubular member and the smooth annular section together. In one embodiment the annular gasket portion and the locking member are co-extruded. In this embodiment, the annular gasket portion and the locking members are made from materials having different durometers, wherein the locking member is made from a material having a durometer that is greater than the durometer of the material that the annular gasket portion is made from. In one embodiment, the locking member is made from a rigid material. In another embodiment the locking member is made from a more flexible material. In one embodiment, the locking member is made from the same material that the second tubular member is made from. The locking member may include notches to facilitate forming a locking annular gasket having an annular shape. In one embodiment sections of the locking member are cut away from the annular gasket portion to form discrete locking cleats about the circumference of the annular gasket portion. In one embodiment, the annular gasket portion includes a sealing portion having a cross-section that is generally round.

The locking annular gasket is used to provide a seal between a first tubular member having an annular groove and an adjacent ridge, and a smooth annular section of a second member. In one embodiment, the locking annular gasket is attached to the smooth annular section of the second member. The first tubular member and the smooth annular section are brought into alignment. The first tubular member and the smooth annular section are relatively moved toward one another to bring the first tubular member and the smooth annular section into a relative surrounded and surrounding relationship. The locking gasket is moved with respect to the first tubular member to engage the locking member with a corrugation ridge. The locking member is deformed by the corrugation ridge until the locking member is moved passed the ridge. Once the locking member moves passed the ridge, the locking member springs into the groove of the first annular member. As the locking member is moved with respect to the first annular member, the annular gasket portion moves into engagement with the first tubular member and the smooth annular section to provide a seal between the first and second members.

In a second embodiment, the locking is placed around the first tubular member with a locking arm of the locking member extending into a corrugation groove. The first tubular member is aligned with the second annular member. The first tubular member is relatively moved toward the smooth annular section to bring the first member and the second member into a relative surrounded and surrounding relationship. The first member is moved with respect to the second member to move the locking member into a smooth annular recess of the second member and to move the gasket portion into engagement with the first tubular member and the second tubular member to provide a seal between the first and second members.

In one embodiment, discrete portions of the locking member are attached to the smooth annular section. In one embodiment, relative movement of the first tubular member with respect to the second tubular member is inhibited by engaging the ridge with the locking arm of the locking member.

DETAILED DESCRIPTION OF THE PREFERRED EMBODIMENTS

The present invention is directed to a locking pipe ring gasket 10 for providing a seal between a first tubular member 12 (FIGS. 3–7) having a plurality of annular grooves 14 and ridges 16, and a smooth annular section 18 of a second member 20, when the first member 12 and the smooth annular section 18 are in a relative surrounded and surrounding relationship, as shown in the accompanying drawings (FIGS. 3A, 3B, 4A, 4B, 5A, 5B, 6 and 7). The locking pipe ring 10 includes an annular gasket 22 and a locking member 24. Referring to FIGS. 3 through 7, the annular gasket 22 seals a gap 26 between the first tubular member 12 and the smooth annular section 18 of the second member 20 when the first tubular member and the smooth section are in a relative surrounded and surrounding relationship. The locking member 24 locks the annular gasket 22 in place when the first tubular member 12 and the smooth annular section 18 are in a relative surrounded and surrounding relationship. The locking of the annular gasket 22, first tubular member 12 and the second member 20 together is facilitated by a locking arm 28 of the locking member 24 that extends into an annular groove 14 of the first tubular member 12, when the first tubular member and the smooth annular section are in a relative surrounded and surrounding relationship.

The annular gasket 22 may be any suitable size or shape that contacts both the first tubular member 12 and the smooth annular section 16 of the second member 20 to adequately seal the gap between the first tubular member 12 and the smooth annular section 16 of the second member. In the exemplary embodiment, the annular gasket 22 includes a sealing portion 30 that is operably connected to a locking member connection portion 32. The sealing portion 30 is adapted to seal the gap between the first tubular member 12 and the smooth annular section 18 when they are in a relative surrounded and surrounding relationship. The seal formed by the sealing portion of the gasket may be a fluid tight seal or a non-fluid tight seal depending on the application. The locking member connection portion 32 of the annular gasket 22 allows the gasket to be fused to a gasket retention portion 34 of the locking member 24. The locking member 24 and the annular gasket may be co-extruded or separately extruded and later bonded together. In one embodiment, the sealing portion 30 of the gasket 22 extends from a co-extruded rigid locking member 40. When the parts are extruded, they are subsequently cut to length and the ends are joined to form a ring.

Figure 1:
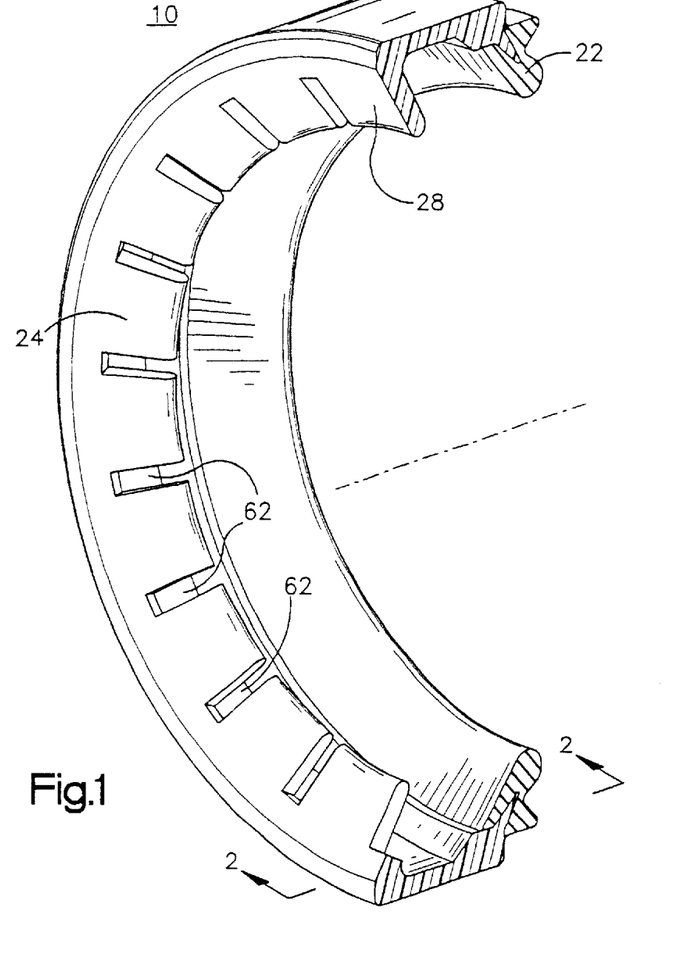
FIG. 1 is a partial view of a locking pipe ring gasket.
Figure 2:
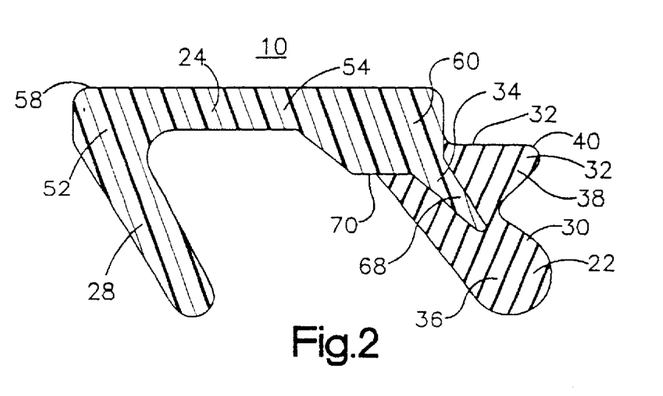
FIG. 2 is a cross-section of a locking pipe ring gasket taken across line 2—2.
Figure 3A:
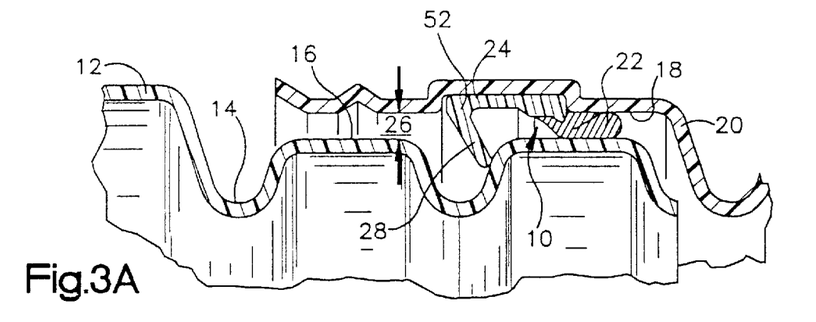
FIG. 3A is a sectional view of a locking pipe ring gasket installed to form a joint between a first tubular member and a second member having a smooth annular section.
Figure 3B:
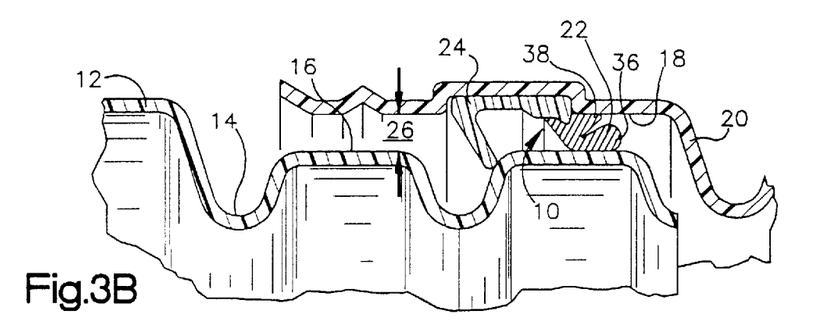
FIG. 3B is a sectional view of a locking pipe ring gasket installed to form a joint between a first tubular member and a second member having a smooth annular section.

One embodiment of the locking pipe ring is shown in FIGS. 1, 2, 3A and 3B. The cross-section of the sealing portion 30 of the annular gasket shown in FIGS. 1, 2 3A and 3B includes a round bulbous portion 36 and a triangular shaped portion 38 with a rounded end 40. Referring to FIGS. 3A and 3B, the round bulbous portion 36 makes contact with the tubular member 12, when the tubular member and the smooth annular section 16 are in a relative surrounded and surrounding relationship. The triangular shaped portion 38 with a rounded end 40 makes contact with the second member 20, when the first tubular member 12 and the smooth annular section 16 are in a relative surrounded and surrounding relationship. The bulbous portion 36 is deflected by the tubular member 12 as the tubular member and smooth annular section 16 are brought into a relative surrounded and surrounding relationship. The locking member connection portion 32 of the gasket has an annular depression in it, adapted to accept the gasket retention portion 34 of the locking member 32.

Figure 4A:
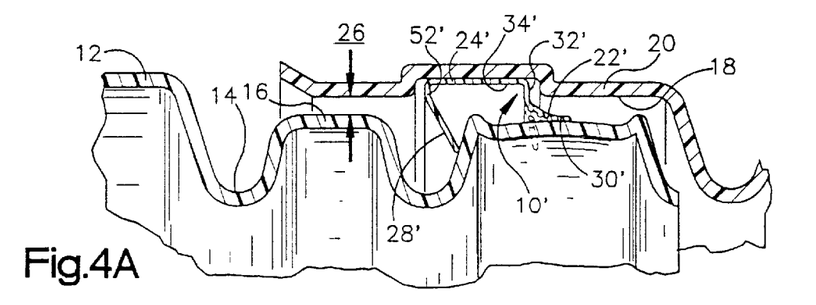
FIG. 4A is a sectional view of a locking pipe ring gasket installed to form a joint between a first tubular member and a second member having a smooth annular section.
Figure 4B:
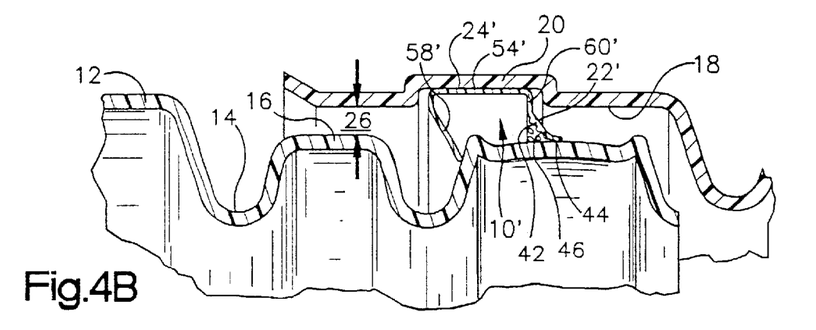
FIG. 4B is a sectional view of a locking pipe ring gasket installed to form a joint between a first tubular member and a second member having a smooth annular section.

A second embodiment of a locking pipe ring 10' is depicted in FIGS. 4 and 4A. This locking pipe ring provides a soil tight seal. The gasket 22' of this embodiment is not intended to provide a fluid tight seal. The gasket 22' of this embodiment is designed to keep dirt from entering the coupled pipes 12, 20. The cross-section of the sealing portion 30' of this embodiment includes a relatively flat portion 42 that is rounded at one end 44. Bumps 46 extend from a surface of the sealing portion of the gasket of this embodiment. When the pipes 12, 20 are assembled, the end of the relatively flat portion 42 is deflected and the bumps that extend from the surface of the sealing portion 30 make contact with the tubular member 12, when the first tubular member 12 and the smooth annular section 18 are in a relative surrounded and surrounding relationship. The smooth annular section 18 of the second member 20 is contacted by the locking member 24'. The formed seal is not fluid tight because the locking member 24 does not form a fluid tight seal with the smooth annular section and portions of the locking member may be cut away so the locking pipe ring can be formed into a shape compatible annular shape to the tubular member 12. Fluid may flow through small openings that are created by cutting away portions of the locking member 24. The locking member connection portion 32' of this type of gasket also has an annular depression 48 in it adapted to accept the gasket retention portion 34' of the locking member 24'.

Figure 5A:
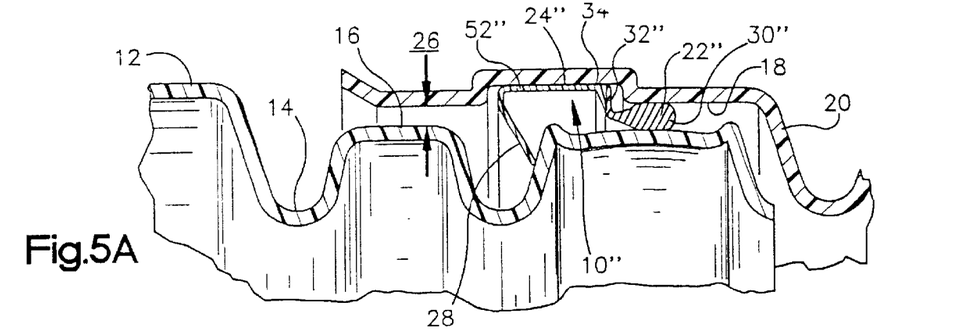
FIG. 5A is a sectional view of a locking pipe ring gasket installed to form a joint between a first tubular member and a second member having a smooth annularsection.
Figure 5B:
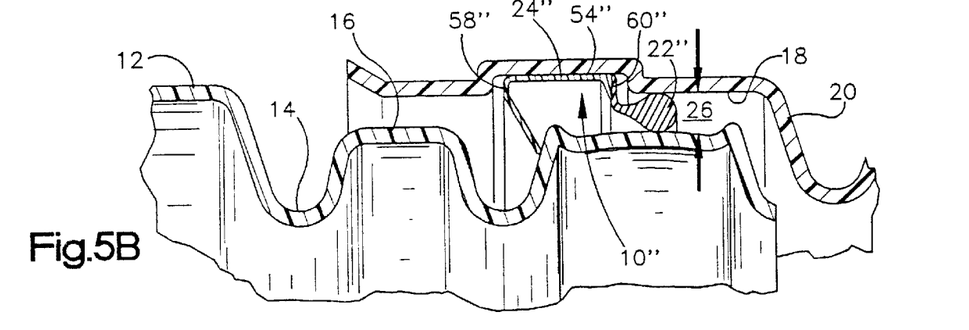
FIG. 5B is a sectional view of a locking pipe ring gasket installed to form a joint between a first tubular member and a second member having a smooth annular section.

A third embodiment of a locking pipe ring 10" is depicted in FIGS. 5A and 5B. The gasket 22" of this embodiment is intended to provide a fluid tight seal. The gasket 22" of this embodiment is designed to keep water under pressure from exiting between the coupled pipes 12, 20. The cross-section of the gasket of this embodiment includes a round sealing portion 30" that transitions down to a slender locking member connection portion 32". When the pipes 12, 20 are-assembled, the round sealing portion 30" is sandwiched between the first tubular member 12 and the smooth annular section 18 of the second member 20, when the tubular member and the smooth annular section 16 are in a relative surrounded and surrounding relationship. The formed seal is fluid tight because the compressed round sealing portion 30" forms a fluid tight seal between the first tubular member 12 and the smooth annular section 18 of the second member 20 around their entire circumferences. The locking member connection portion 32" of this type of gasket also has a notch 50 in it adapted to accept the gasket retention portion 34" of the locking member 24".

The annular gasket 22 of the locking pipe ring can be made from any acceptable material that forms an appropriate seal for the given application. In one embodiment, the annular gasket 22 is made of ASTM F477 Low Head or High Head material. ASTM F477 LH material has a durometer of fifty plus or minus five. One company that makes ASTM F477 material is Advanced Elastomer Systems. Santoprene is Advanced Elastomer System's brand name for ASTM F477 material. Advanced Elastomer Systems part number for this material is Santoprene 101-55. Advanced Elastomer Systems is located in Akron Ohio. A second company that makes this material is Multibase. Multibase' part number for this material is 5904LC.

The extruded shape of the locking member 24, 24', 24", 24'" has the general shape of a channel. In each exemplary embodiment, the locking member includes a locking arm 28, 28', 28", 28'", an abutting portion 54, and a gasket retention portion 56, 56', 56", 56'". The locking arm 28, 28', 28", 28'" of the locking member locks the locking pipe ring 10 on the first tubular member 12. The abutting portion 54, 54', 54", 54'" abuts the smooth annular section 18 of the second member 20. The gasket retention portion 56, 56', 56", 56'" facilitates fusion to the annular gasket 22 during extrusion of the locking pipe ring or after the gasket 22 and locking member 24 are separately formed. Each abutting portion has a first end 58, 58', 58", 58'" and a second end 60, 60', 60", 60'" The locking arm 28, 28', 28", 28'" extends from the first end 58, 58', 58", 58'" of the abutting portion 54, 54', 54", 54'" and the gasket retention portion 56, 56', 56", 56'" extends from the second end of the abutting portion. The locking arm 28, 28', 28", 28'" extends downward from the abutting portion and toward the second end of the abutting portion. The gasket retention portion 46, 46', and 46" extends downward from the second end 60, 60', 60", 60'" at the abutting portion (FIGS. 3–6). The transition 52, 52', 52", 53'" from the locking arm to the abutting portion allows the locking arm to deflect toward the second end of the abutting portion when pressure is applied to the locking arm as the first and second members 12, 14 are assembled. The deflection of the locking arm is facilitated by a large radius of curvature between the abutting portion and the locking arm (FIG. 6) by a straight line segment that connects the locking arm 42 to the abutting portion 44 (FIGS. 4–5), or by increasing the thickness in the transition area.

The deflection of the locking arm 28, 28', 28", 28'" is also accommodated by appropriately sizing the thickness of the locking arm and the abutting portion 54, 54', 54", 54'" and constituting them from a sufficiently flexible material. In the embodiment shown in FIGS. 4–6, the locking arm and the abutting portion are approximately 0.080 inch thick. The locking arm may be longer than the abutting portion. When the first tubular member 12 and the smooth annular section 18 of the second member 20 are in a surrounded and surrounding relationship, the locking arm 28, 28', 28", 28'" of the locking member extends into a groove 14 of the first tubular member.

Figures 8, 9:
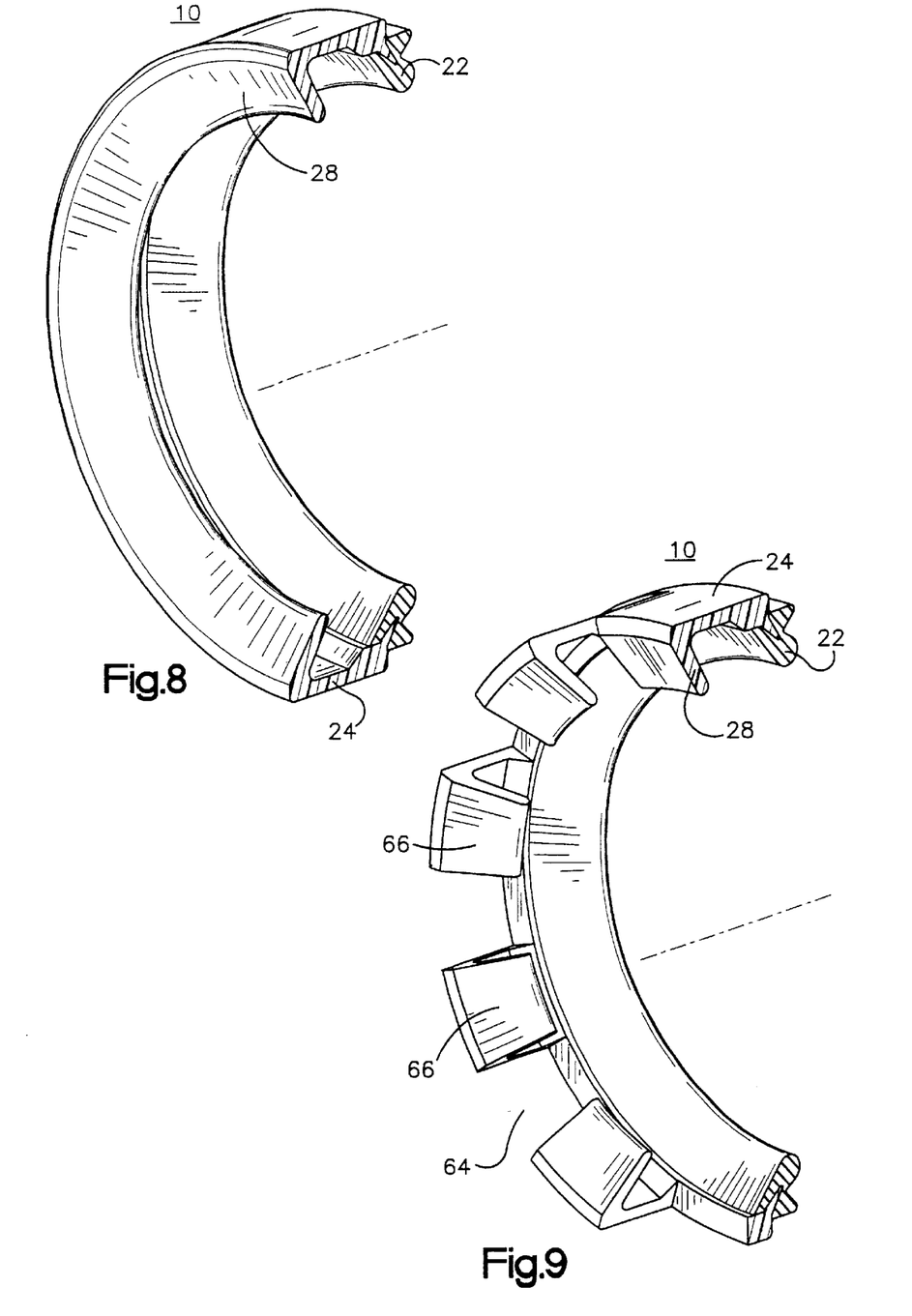
FIG. 8 is a partial view of a locking pipe ring gasket.
FIG. 9 is a partial view of a locking pipe ring gasket.

One embodiment of the locking member 24 is shown in FIGS. 1, 2, 3A, 3B. The locking member 24 of this embodiment includes a relatively thick locking arm 24, a relatively thick abutting portion 54 and a relatively thick gasket retention portion 56. The greater thickness of the locking member 24 of this embodiment increases the insertion force required to bring the first tubular member 12 and smooth annular 18 section into engagement and surrounding relationship. However, the strength of the locking member is also increased by the greater thickness, allowing more of the locking member to be cut away from the extruded locking pipe ring 10. Referring to FIG. 2, small notches 62 may be cut into the locking member to facilitate formation of an annular shape. Referring to FIG 9, large notches may be cut into the locking member to form individual locking cleats 66. Referring to FIG. 8, when the locking member 24 is constructed from a less rigid material, notches do not need to be cut into the locking member to form an annular shape. In this embodiment, the gasket retention portion 56 of the locking member provides a large area to fuse the gasket to. The gasket retention portion 56 has a tapered projection 68 that corresponds with the annular depression 48 in the gasket. Additionally, the gasket retention portion 56 provides a flat surface 70 for a flat surface of the gasket to fuse to after extrusion.

A second embodiment of the locking member 24' is shown in FIGS. 4A and 4B. The locking member 24' of this embodiment includes a thinner locking arm 28', a thinner abutting portion 54' and a thinner gasket retention portion 56'. The reduced thickness of the locking member 24' of this embodiment decreases the insertion force required to bring the first tubular member 12 and smooth annular section 18 into a relative surrounded and surrounding relationship. However, the strength of the locking member is also decreased by the reduced thickness, allowing less of the locking member 24' to be cut away from the extruded locking pipe ring 10'. In this embodiment, the gasket retention portion 56' of the locking member tapers down to fit within the small annular depression of the gasket.

A third embodiment of the locking member is shown in FIGS. 5A and 5B. The locking member 24" of this embodiment also includes a thinner locking arm 28", a thinner abutting portion 54" and a thinner gasket retention portion 56". In this embodiment, the gasket retention portion 56" of the locking member provides a large surface corresponding to the notch in the locking member connection portion of the gasket. The large surface of the gasket retention portion 56" allows the gasket 22" to be reliably fused to the locking member 40".

Figure 6:
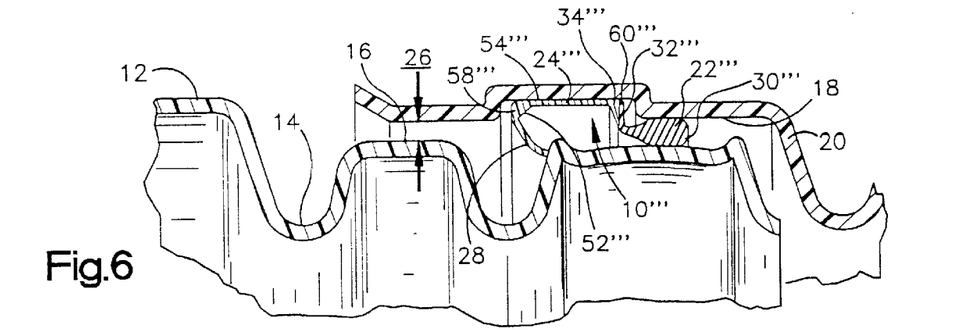
FIG. 6 is a sectional view of a locking pipe ring gasket installed to form a joint between a first tubular member and a second member having a smooth annular section.
Figure 7:
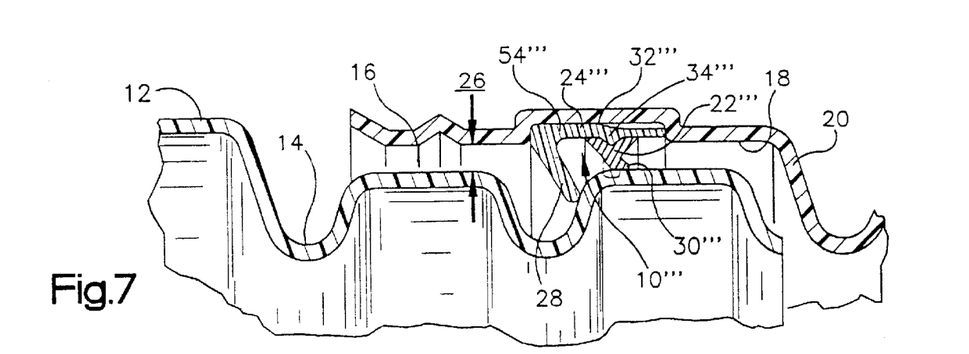
FIG. 7 is a sectional view of a locking pipe ring gasket installed to form a joint between a first tubular member and a second member having a smooth annular section.

A variation of the locking pipe ring of the third embodiment is depicted in FIG. 6. In this embodiment, the locking member 24''' is more flexible. The locking member 24''' of this locking ring 10''' is made from a more flexible material such as an 80 durometer thermoplastic, which is readily available from Advanced Elastomer Systems and Multibase. In addition the thickness of the locking member 24''' is increased at the transition 52''' from the locking arm 28 to the abutting portion 54 of the locking member. Another embodiment of the locking pipe ring is depicted in FIG. 7.

The locking member is made of a relatively rigid material. In one embodiment, the locking member 24, 24', 24'', 24''' may be made of a blend of low density and high density polyethylene. In another embodiment, the locking member 24 is made from a less rigid material, such as an 80 durometer thermoplastic manufactured by Advanced Elastomer Systems and Multibase to increase the flexibility of the locking member. In one embodiment, the locking member is made from the same material as the first tubular member 12 or second member 20 that the locking pipe ring is being used with. By constructing the locking member of material which is the same or similar to the material used to construct the second tubular member 20, the locking member can be easily welded or bonded to the tubular member. For example in one test the material used to secure the locking member was the same polyethylene material-used to make the polyethylene tubular member and was supplied by the pipe manufacturer.

In one embodiment, the more rigid locking member 24' and the elastic annular gasket 22 are co-extruded. The softer material of the annular gasket 22 is extruded by one extrusion machine and the more rigid material of the locking member is extruded by a second extrusion machine. The material of the locking member 24 and the gasket are bonded together as they leave the extruders. The joined extruded materials form a continuous strip. When initially formed, the entire length of the strip includes a continuous locking member and a continuous gasket. FIGS. 1–9, show the co-extruded locking members 24 and gaskets 22. The gasket 22 and locking member 24 are bonded together during the extrusion process. The strip is cut to lengths and each length is joined at opposite ends to form annular gaskets as shown and described, although it is contemplated that the gasket can be use in applications where other than an annular seal is desired.

In another embodiment, the locking member and the gasket are bonded together by some means other than co-extrusion. The gasket may be attached to the locking member by adhesives or any other acceptable attachment method.

In another embodiment, the locking member and the gasket are not bonded together. In this embodiment, the gasket is placed on the tubular member. A separate locking member affixes the gasket to the pipe. The locking member of this embodiment may have a flange which connects the gasket to the pipe.

When the locking member is made from a rigid material, the extruded locking member 24 and gasket 22 cannot be easily formed to fit the annular shape of a pipe in their initial form. In an embodiment shown in FIG. 9, the extruded locking arm is cut away except for several distinct sections that form cleats 66. With substantial portions of the locking member cut away, the extruded locking member and gasket can easily be manipulated to fit the shape of a tubular member to form the locking pipe ring 10. In an embodiment separate cleats 66 that remain are spaced about the periphery of the tubular member 12. The spacing of the cleats 66 does not have to be equal. In an embodiment of the invention, the spaced portions or individual pieces of the locking member 40 are approximately one inch long circumferentially.

Referring to FIG. 1, in another embodiment, portions of the locking member 24 are notched away to allow the locking member to deform to the shape of the tubular member. The notches in the locking member can be of any size or shape, so long as they allow the extruded locking member and gasket to be formed into a locking pipe ring. Any portion of the locking member may be notched away. In the embodiment shown in FIG. 1, segments of the locking arm are removed. The width of the segments cut away can be increased for greater flexibility of the locking pipe ring.

In the embodiments shown in FIG. 8, the locking member 24 is made from a material that is flexible enough to allow the extruded locking member and gasket to be formed into an annular shape without notching away any of the locking member.

An appropriate length of extruded locking member 24 and gasket 22 for a given pipe, is cut and its ends are bonded together to form a locking pipe ring 10. The first tubular member 12 having a plurality of annular grooves 14 and ridges 16 and the smooth annular section 18 of a second member 20 that are to be sealed together by the locking pipe ring 10 are provided. Referring to FIGS. 3–7, the locking pipe ring may be installed by at least two different methods.

In a first installation embodiment, the abutment portion of the locking member 24 is welded or fused to the smooth annular section 18 of the second member 20, before the first tubular member 12 and the smooth annular section 18 are brought into a relative surrounded and surrounding relationship. In this embodiment, pressure is applied to the locking arm 28 and then to the gasket 22 by a ridge 16 of the first tubular member as the first tubular member is inserted into the second member 20. The locking arm 28 and gasket 22 are deflected in the direction of insertion of the first tubular member 12. The first tubular member 12 is further inserted into the second member 20 until the locking arm reaches an annular groove 14. When the locking arm 28 reaches a groove, it snaps into the groove. As the first tubular member 12 is inserted into the second member, the gasket 22 is brought into contact with the first tubular member 12. In fluid tight seal, applications, the gasket 22 is brought into contact with the first tubular member 12 and the smooth annular section 18 of second member 20 to form a fluid tight seal. The first tubular member 12 and second member 20 are locked together by the locking member 24. The locking member 24, which is welded or bonded to the smooth annular section, prevents the tubular member from being removed from the second member 20. The first tubular member 12 is prevented from being removed by the locking arm 28 which extends into one of the tubular member's annular grooves 14 when fluid pressure or other sources of force pull the first tubular member 12 apart from the second member 20. As the first tubular member 12 and second member 20 are forced apart, the locking arm that extends into one of the annular grooves 14 is forced against the side of the groove that it occupies, preventing the first tubular member and the second member from being pulled apart.

In a second installation embodiment, the locking pipe ring 10 is placed around the circumference of the first tubular member 12 with the locking arm 28 of the locking member 24 extending into one of the annular grooves 14, before the first tubular member and the smooth annular section are brought into a relative surrounded and surrounding relationship. In this embodiment of the invention, the smooth annular section 18 includes a recess 72 that is recessed from the rest of the inner surface of the second member. In this embodiment, pressure is applied to the gasket 22 and the locking arm 28 by a ridge 16 of the first member 12 as the first tubular member 12 is inserted into the second member. The locking member 24 is pushed to the side of the annular groove 14 opposite the direction of insertion by the second member as the first tubular member 12 is inserted into the second member 20. The locking arm 28 is deflected by the second member 20 as the tubular member is inserted into the second member. The first tubular member 12 is further inserted into the second member until the abutting portion 54 reaches the recess 72 in smooth annular section 18 of the second member 20. When the ends of the abutting portion 54 reach the edges of the recess 72 in the smooth annular section 18 of the second member, the abutting portion 54 of the locking member snaps into the recess 72. As the first tubular member is inserted into the second member, the gasket 22 is brought into contact with the first tubular member 12. In fluid tight seal applications, the sealing portion of the gasket 20 is brought into contact with the first tubular member 12 and the smooth annular section 18 of the second member 20 to form a fluid tight seal. The first tubular member 12 and second member 20 are locked together by the locking member 24. The locking member 24 is constrained by the recess 72 in the smooth annular section 18 and by the annular groove 14 that the locking arm extends into. The first tubular member 12 is prevented from being removed by the locking arm which extends into one of the tubular member's annular grooves 14 when fluid pressure or other sources of force pull the first tubular member 12 apart from the second member 20. As the first tubular member 12 and second member 14 are forced apart, the locking arm that extends into one of the annular grooves 18 is forced against the side of the groove that it occupies and the edge of the locking member is forced against the edge of the recess 72 preventing the first tubular member and the second member from being pulled apart.

I claim:

1. A locking annular gasket for providing a seal between a first tubular member having an annular groove and an adjacent ridge, and a smooth annular section of a second member, when the first member and said section are in relative surrounded and surrounding relationship, comprising:

a) an annular gasket portion made from a first material having a first durometer that seals a gap between said ridge of said first tubular member and said annular section when the first member and said section are in a relative surrounded and surrounding relationship; and b) a locking member made from a second material of a second durometer that is harder than said first material, said locking member bonded to the gasket portion and adapted to extend into a groove in said first member to hold said annular gasket portion in place and lock said first member and said section in a relative surrounded and surrounding relationship.

2. The gasket of claim 1 wherein said first member is a corrugated pipe and said locking member includes a locking arm that extends into said annular groove in said corrugated pipe when the first member and the section are in relative surrounded and surrounding relationship to lock said first tubular member and said annular section together.

3. The gasket of claim 1 wherein said annular gasket portion and said locking member are co-extruded.

4. The gasket of claim 3 wherein said annular gasket portion is made from a material having a first durometer said locking member is made from a material having a second durometer, and said first durometer is less than said second durometer.

5. The gasket of claim 1 wherein said locking member extends around a circumference of said annular gasket portion.

6. The gasket of claim 1 wherein said locking member is made from a flexible material.

7. The gasket of claim 1 wherein said locking member is made from a rigid material.

8. The gasket of claim 5 further comprising notches in said locking member to facilitate forming an annular shape of said locking annular gasket.

9. The gasket of claim 3 further comprising discrete locking cleats formed about a circumference of said annular gasket portion by cutting sections of said locking member away from said annular gasket portion.

10. The gasket of claim 1 wherein said annular gasket portion has a sealing portion with a generally round cross-section.

11. A method of providing a seal between a first tubular member having an annular groove and an adjacent ridge, and a smooth annular section of a second member, comprising:

a) bonding a locking annular gasket, including an annular gasket portion and a locking member attached to the gasket portion, to said smooth annular section;

b) aligning said first tubular member with said smooth annular section;

c) relatively moving said first tubular member toward said smooth annular section to bring the first member and the section into a relative surrounded and surrounding relationship;

d) moving said locking gasket with respect to said first tubular member to engage said locking member with said ridge, deform said locking member with said ridge, move said locking member past said ridge allowing said locking member to extend into said groove, and move said annular gasket portion into engagement with said fist tubular member and said smooth annular section to provide a seal between the first and second members.

12. The method of claim 11 wherein discrete portions of said locking member are attached to said smooth annular section.

13. The method of claim 11 further comprising inhibiting relative movement of said first tubular member and said smooth annular section by engaging said ridge with a locking arm of said locking member.

14. A method of providing a seal between a first tubular member having an annular groove and an adjacent ridge, and a second member having a smooth annular recess comprising:

a) placing a locking annular gasket, including an annular gasket portion and a locking member attached to the gasket portion, around said first tubular member with a locking arm of said locking member extending into said groove;

b) aligning said first tubular member with said second member;

c) relatively moving said first tubular member toward said second member to bring the first member and the second member into a relative surrounded and surrounding relationship;

d) moving said locking gasket with respect to said second member by engaging the arm of said locking member with said ridge of said first member to move said locking member into said smooth annular recess and move said gasket portion into engagement with said first tubular member and second member to provide a seal between the first and second members.

15. A corrugated pipe coupling, comprising:
   a) a corrugated pipe having an annular groove and an annular ridge;
   b) an annular section having a smooth inner surface disposed around said corrugated pipe;
   c) a locking annular gasket disposed between said corrugated pipe and said annular section, the locking gasket including a gasket portion that extends onto said annular ridge and a locking member bonded to said gasket portion, said locking member having a locking arm that extends into said annular groove and being constrained by said annular section to lock said corrugated pipe and said annular section together.

16. The corrugated pipe coupling of claim 15, wherein said locking arm is bonded to said annular section.

17. The corrugated pipe coupling of claim 15, wherein said locking arm is constrained by an annular recess in the annular section.

18. The gasket of claim 15 wherein said annular section and said locking member are made from the same material.

19. A method of providing a seal between a corrugated pipe having an annular groove and an adjacent ridge, and a smooth annular section of an outer member, comprising:
   a) fixedly attaching a locking annular gasket, including an annular gasket portion and a locking member bonded to the gasket portion, to a smooth annular section;
   b) aligning a corrugated pipe with the smooth annular section;
   c) relatively moving the corrugated pipe toward the smooth annular section to bring the corrugated pipe and the section into a relative surrounded and surrounding relationship;
   d) moving the locking gasket with respect to the corrugated pipe to engage the locking member with said ridge of the corrugated pipe;
   e) deforming said locking member with said ridge;
   f) moving said locking member past said ridge, such that said locking member extends into said groove; and,
   g) engaging said corrugated pipe with said gasket portion to form a seal.

20. The method of claim 19, wherein said corrugated pipe is positioned within the smooth annular section.

21. A method of providing a seal between a corrugated pipe having an annular groove and an adjacent ridge, and a smooth annular section of an outer member, comprising:
   a) placing a locking annular gasket, including an annular gasket portion and a locking member bonded to the gasket portion, around a corrugated pipe with a locking arm of the locking member extending into a groove of said corrugated pipe;
   b) aligning the corrugated pipe with a smooth annular section;
   c) relatively moving the corrugated pipe toward the smooth annular section to bring the corrugated pipe and the section into a relative surrounded and surrounding relationship;
   d) moving the gasket with respect to the smooth annular section by engaging the locking arm with said ridge of the corrugated pipe to move the locking member into a recess in the smooth annular section to constrain the locking gasket; and,
   e) engaging the corrugated pipe with said gasket portion to form a seal.

22. The method of claim 21, wherein said corrugated pipe is positioned within the smooth annular section.

* * * * *